United States Patent [19]

Williams

[11] 4,010,898

[45] Mar. 8, 1977

[54] IRRIGATION METHOD AND APPARATUS

[76] Inventor: David M. Williams, 165 Riker Terrace, Salinas, Calif. 93901

[22] Filed: July 21, 1975

[21] Appl. No.: 597,327

[52] U.S. Cl. .................................. 239/11; 239/547; 239/567

[51] Int. Cl.² .......................................... B05B 1/04

[58] Field of Search ............. 239/1, 547, 542, 550, 239/567, 11; 47/9

[56] References Cited

UNITED STATES PATENTS

| | | | |
|---|---|---|---|
| 652,141 | 6/1900 | Raupp | 239/567 |
| 1,245,663 | 11/1917 | Black | 341/242 |
| 1,406,070 | 2/1922 | Patton | 4/148 |
| 2,210,180 | 8/1940 | Richardson | 239/279 |
| 2,747,935 | 5/1956 | Szantay | 138/89 |
| 2,807,505 | 9/1957 | Weitzel | 239/145 |
| 2,814,529 | 11/1957 | Arnt | 239/208 |
| 2,909,328 | 10/1959 | Babyak | 239/567 X |
| 3,091,401 | 5/1963 | Hruby, Jr. | 239/567 X |
| 3,185,397 | 5/1965 | Nelson | 239/567 X |
| 3,301,515 | 1/1967 | Gerbracht | 248/87 |
| 3,302,323 | 2/1967 | Popa | 47/9 |
| 3,387,786 | 6/1968 | Rynberk | 239/201 |
| 3,526,109 | 9/1970 | Kirche | 68/222 |
| 3,613,309 | 10/1971 | Coburn | 47/18 |
| 3,815,831 | 6/1974 | Jooste | 239/498 |

Primary Examiner—Johnny D. Cherry
Assistant Examiner—Michael Mar
Attorney, Agent, or Firm—Brown & Martin

[57] ABSTRACT

A method and apparatus for distributing irrigation water and the like around agricultural plants. The apparatus includes a semi-permanent, semi-looped elastic distributing conduit having a closed end and an open end, with a plurality of spray nozzles in the upper surface of the conduit for distributing liquid outward from the plant in fan-like overlapping patterns. The apparatus becomes a semi-permanent installation, and the method includes the placing of such a semi-looped distributor close in about a plant and arranging the spray patterns to have a substantially fan-like configuration extending outward from the plant and overlapping.

14 Claims, 6 Drawing Figures

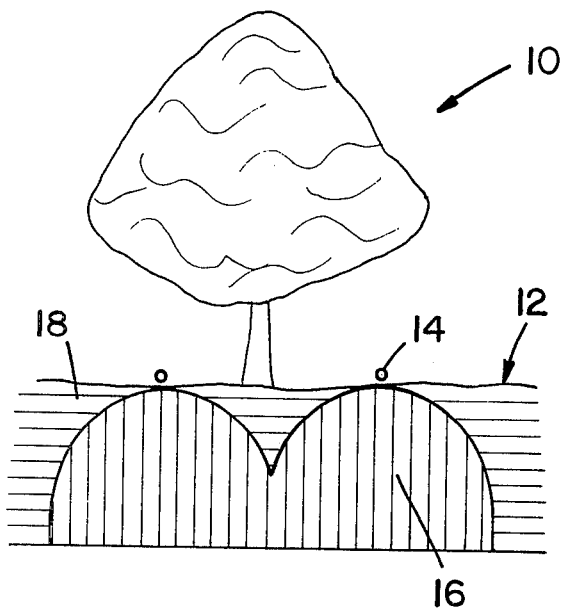
FIG_1 (PRIOR ART)
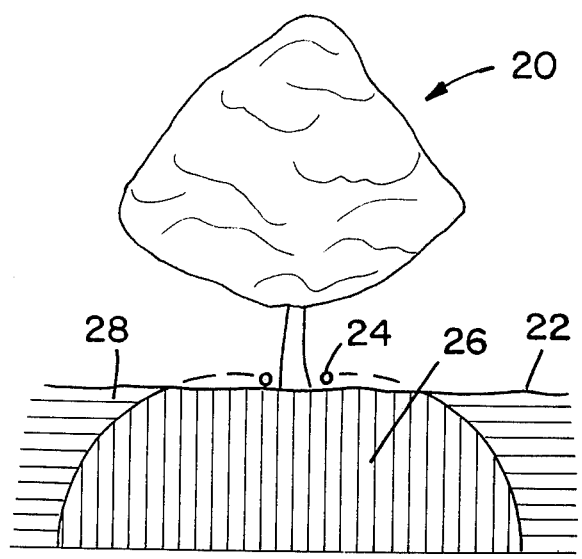
FIG_2
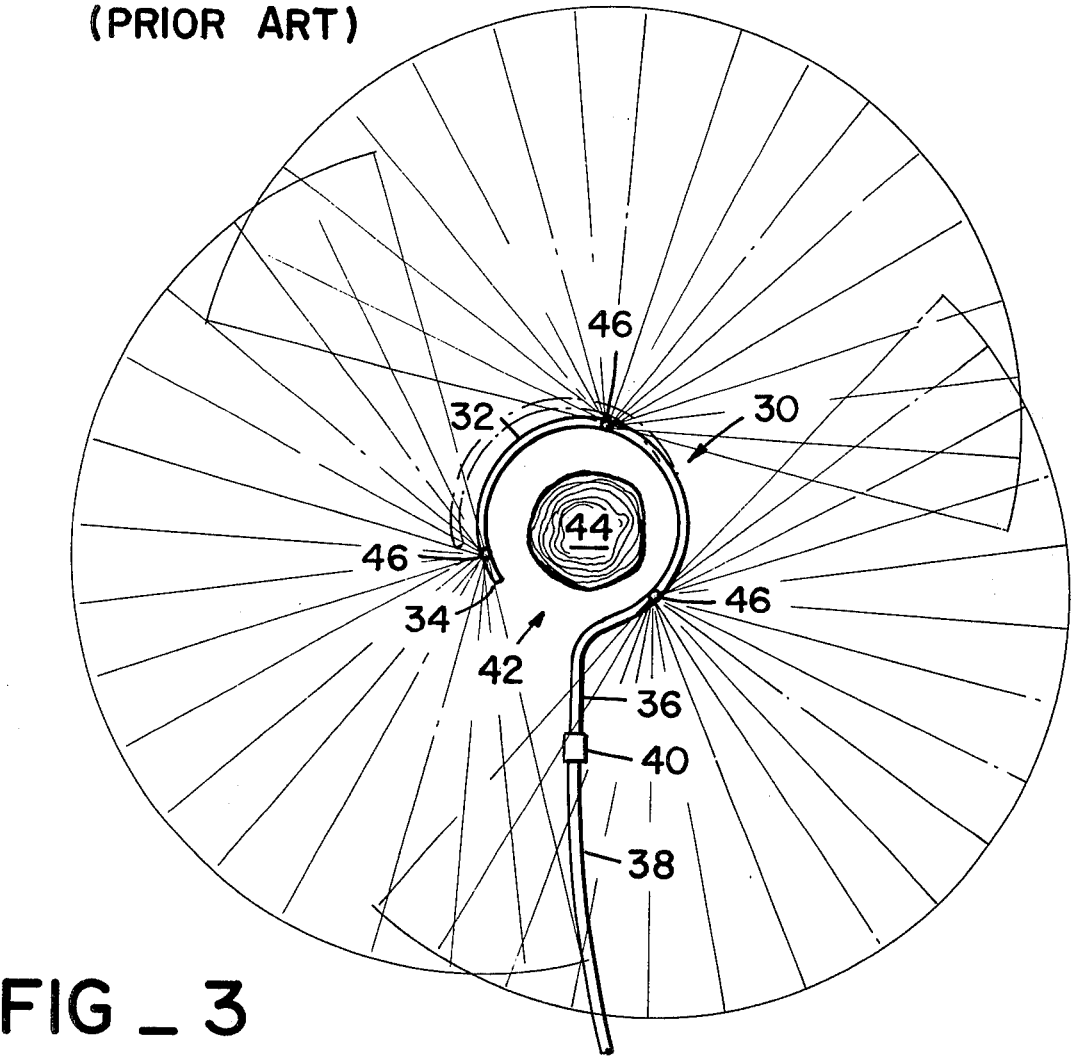
FIG_3

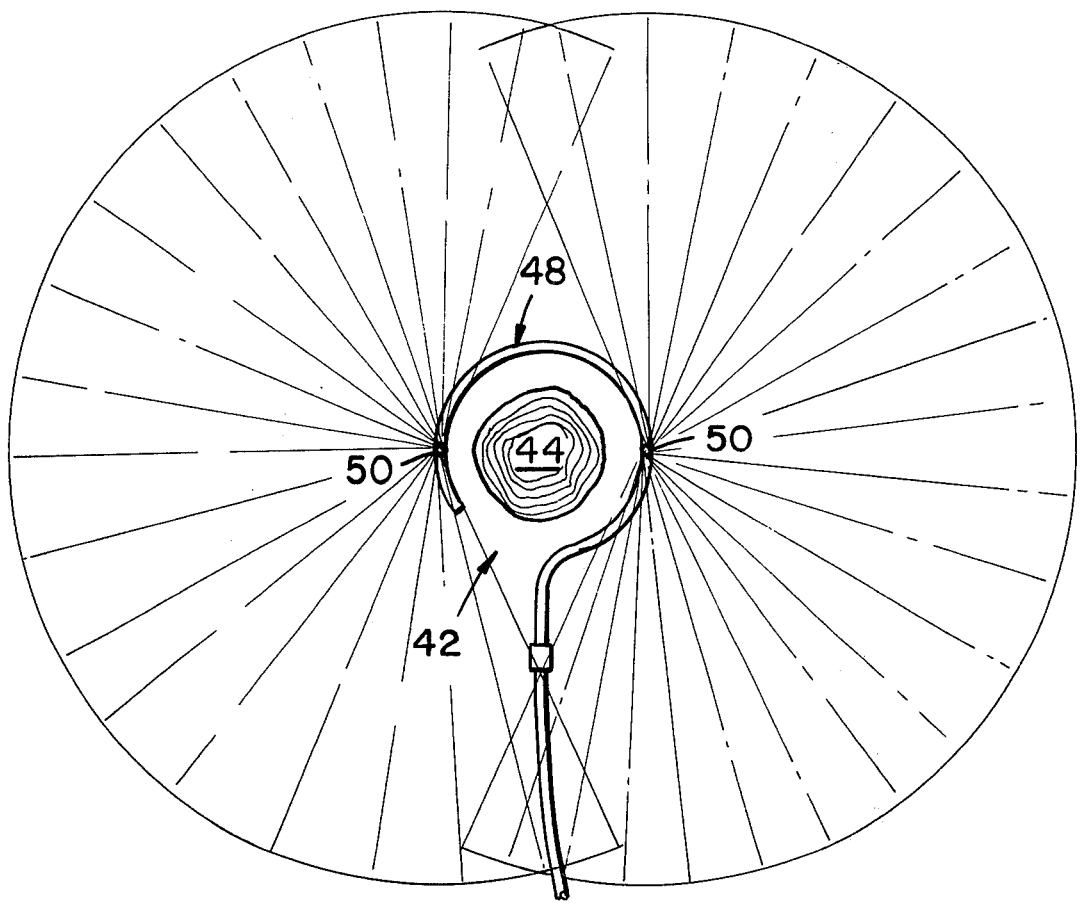
FIG_4
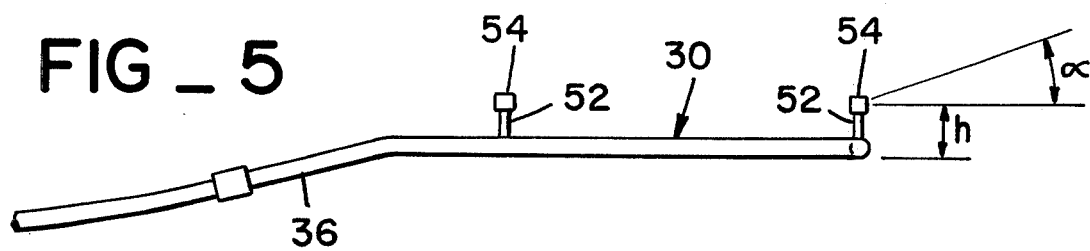
FIG_5
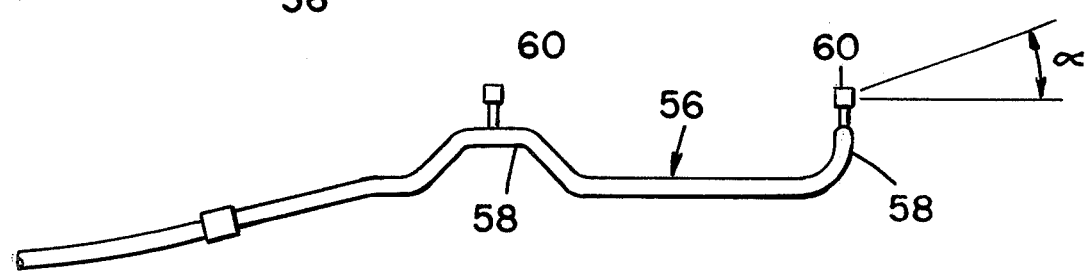
FIG_6

IRRIGATION METHOD AND APPARATUS

BACKGROUND OF THE INVENTION

The present invention relates generally to irrigation systems and pertains particularly to method and apparatus for the controlled irrigation of individual plants.

Agricultural production is heavily dependent upon the application of adequate water to sustain plant growth. In many areas of the world, however, rainfall is insufficient in amount and uncertain as to intervals for successful agricultural production. In order to sustain agricultural production in these areas, water available from rivers, lakes or the like must be applied to the crops by various irrigation methods.

Numerous irrigation methods are known and many of these methods are satisfactory for most crops. The usual methods of irrigation available are gravity flow, sprinkler, and drip irrigation. Gravity flow for flood irrigation is adequate in areas where adequate water is available and the slope of the terrain is suitable. This is perhaps the easiest and less expensive method where suitable.

The sprinkler method of irrigation is suitable for areas where gravity feed is not feasible and permits greatly expanded use of agricultural land. The application by sprinklers is also suitable for many crops.

The drip method of irrigation has been developed for areas where water is not plentiful and provides a more efficient use of available water than the previous two mentioned methods.

One problem with each of these methods is that much of the water available for irrigation purposes includes or contains some salts. They become a problem for plants which are salt sensitive because salts tend to accumulate within the soil around the plants due to evaporation of the water from the soil surface and uptake of water by the plants.

Another problem, with at least the sprinkler system of irrigation, is that some plants are sensitive to the effects of salts deposited on leaf surfaces from sprinkler water evaporating from these surfaces. In addition, the free moisture on plant tissue is at times conducive to the development of pathogenic bacteria and fungi. Even with carefully placed sprinklers, wind can cause uneven application of the water by the sprinklers and also cause water to accumulate on the plants.

Another problem with sprinkler irrigation is that the power requirements are generally high.

The so called drip irrigation is a high-frequency pressure system that is a recent development permiting more efficient use of irrigation water. This system since its inception has become quite popular and is quite extensively used throughout the world. High frequency pressure systems generally permit a much higher level of efficiency of use of the water than either gravity or sprinkler systems. They also have a lower power requirement than sprinkler systems and can be designed to operate with a low per acre labor input.

This concept of high-frequency irrigation involves the addition of water to the crop at frequent intervals, at times daily, in controlled amounts approximately equal to that used by the crop in evapo-transpiration plus an additional amount to effect some leaching of the soil to prevent accumulation of salt to a level adverse to the crop.

Several methods have been used in the high-frequency application of irrigation water to agricultural crops. These methods include the dripper which is an emitter that discharges water in discrete drops at a rate of from one to three gallons per hour, the porous hose which may ooze water at a rate of from 1/10 to 1 gallon per hour per foot of hose, a spitter which is commonly a fixed angle sprayer which discharges water at a rate of from 1/10 to 4/10 gallons a minute as a fan spray, and the bubbler which is an open port that emits water at a low discharge velocity at a volume from one to three gallons per minute. Each of these methods has advantages and disadvantages.

One of the hazards of irrigated agriculture is the result of buildup in the soil of salts remaining after the evapo-transpiration of water by the crop. Many irrigation waters, for example, contain upward of 1½ tons of salts per acre foot of water and with crop usage of water in hot climates reaching from four to six acre feet per acre annually upwards of eight tons of salt may be deposited in the soil per acre per year. Such a high concentration of salt can have an adverse affect upon the crops grown in the area.

One approach to the prevention of buildup of deleterious levels of salt within the crop root zone is by adding somewhat more water than required by the crop and leaching the accumulating salts downward below the root zone. The degree of leaching is a function of the volume of water applied in relation to the volume of soil and the evapotranspiration requirements of the crop.

Salt accumulation near the soil surfaces is particularly a problem in arid regions where there is insufficient rainfall to leach the salt to a depth below the root zone. It is, therefore, desirable to prevent an appreciable accumulation of salt near the soil surface above the root zones of the crops. The dripper and porous tubing approach to high frequency irrigation systems frequently results in an undesirable accumulation of salt near the surface of the soil. Good application of the spitter concept, however, permits a relatively large surface area to be wetted with resultant downward movement of salt and can result in a minimum of salt accumulation in soil over the root zone as compared with porous tubing or drippers. The use of the spitter method, however, has not been satisfactory because of the lack of satisfactory equipment available to permit its efficient use for many crops.

Citrus and other such crops, for example, even those sensitive to salt and other such problems associated with irrigation are adaptable to arid regions where proper irrigation methods and apparatus are available.

Irrigation equipment and methods for use in orchards must meet several fairly exacting requirements, such as equipment should be out of the way of cultural and harvesting operations as well as sufficiently strong to withstand any chance contact which might result from harvesting and cultivating equipment. The equipment method should also be capable of wetting the same area each time that water is applied and should be readily accessible for checking and maintaining for satisfactory performance. The equipment must also be sufficiently rugged to withstand adverse elements of the weather.

The prior art approach to various irrigation methods and equipment is exemplified by the following U.S. reference patents: No. 2,747,935 issued May 29, 1956 to Szanthay; No. 2,807,507 issued Sept. 24, 1957 to Cook; No. 3,301,515 issued Jan. 31, 1967 to Gerbracht; No. 3,302,323 issued Feb. 7, 1967 to J. Popa; and No. 3,613,309 issued Oct. 19, 1971 to Coburn.

These various approaches to the prior art, however, fail to overcome the aforementioned problems.

SUMMARY AND OBJECT OF THE INVENTION

In accordance with the primary aspect of the present invention, an irrigating apparatus is constructed of a semipermanently, looped shaped, semi-circular elastic conduit means for close fitting permanent installation about the trunk of a tree or plant and includes outwardly directed spray nozzles of distributing liquid in fan-like patterns outward away from the plant to cover fan-like areas that overlap to cover a continuous annular surface radiating outward from the plant. The method of the invention is carried out by the installation of such an apparatus and an arrangement of the spray pattern and application of the irrigating liquid to cover an outwardly directed annular area away from the tree trunk or plant covering a consistent and constant area during each application.

It is a primary object of the present invention to overcome the above problems of the prior art.

Another object of the present invention is to provide an irrigation method and apparatus utilizing the high-frequency pressure application that is effective to prevent the accumulation of dangerous levels of salt above the root zone of plants.

A further object of the present invention is to provide a method and apparatus for the application of irrigation water to an agricultural plant in a manner to prevent wetting of the plant as well as prevent the deleterious accumulation of salt within the soil above the root zone of the plant.

BRIEF DESCRIPTION OF THE DRAWING

The above and other objects and advantages of the present invention will become apparent from the following description when read in conjunction with the drawings wherein:

FIG. 1 is an elevational view partial end section of an agricultural plant showing the result of prior art irrigation systems;

FIG. 2 is an elevational view partial end section showing the result of irrigation in accordance with the present invention;

FIG. 3 is a plan view of an apparatus in accordance with the present invention;

FIG. 4 is a plan view of an alternate embodiment of the apparatus of FIG. 3;

FIG. 5 is an elevational view of the distributing apparatus of FIG. 4; and,

FIG. 6 is an elevational view of an alternate embodiment of the apparatus of FIG. 5.

DETAILED DESCRIPTION OF THE PREFERRED EMBODIMENTS

Turning now to FIG. 1 of the drawings, there is illustrated an example of the results of the prior art approach to irrigation of a plant such as a fruit tree. As best illustrated in FIG. 1, a plant such as a fruit tree generally designated by the numeral 10 is shown growing in an earth formation such as designated generally by the numeral 12. A suitable irrigation system or apparatus such as a dripper or porous hose 14 is shown distributed around the tree in the usual manner. Water distributed through the hose goes onto the ground and downward with sufficient water added to wet and leach downwardly a major zone of wetting designated by the vertically cross-sectioned portion designated generally by the numeral 16. As can be seen, this section in cross-section shows the areas of major zone of wetting having a generally parabolic shape opening downward from the hose or distributor 14. The root zone, of course, will be within this area directly below and outward from the tree trunk. The size and density of the root zone will be largely a reflection of available moisture within the soil mass.

Areas of the soil where downward movement of water does not occur will have salt accumulation as a result of capillary movement of water and its subsequent loss from the soil by evaporation or transpiration and will involve an area generally designated by the numeral 18 and shown in horizontal hatching. As will be appreciated, the central portion of this horizontally hatched salt zone will include a large portion directly below the tree trunk and directly above the root zone of the tree. This can be very deleterious to a plant which is salt sensitive and especially should small amounts of rain fall which is sufficient to leach the salt from the layer above the root zone downward into the root zone.

Turning now to FIG. 2 there is illustrated an example of an arrangement of the present invention which is devised to overcome the problems associated and illustrated in FIG. 1. As will be appreciated from this Figure, a tree 20 growing in a soil formation 22 has the usual root zone extending downward and outward from the tree trunk. An irrigation system in accordance with the present invention includes a loosely positioned semi-loop distributor 24 looped closely around the trunk of the tree as shown at 24. The term semi-loop used herein to define a shape that falls short of forming a complete loop by leaving what is termed a throat area to be defined later.

The distribution apparatus 24, to be more specifically described later, fits closely around the trunk of the tree and includes distributing nozzles which spray or force a pattern of the water outward in fan-like patterns extending over an area extending from the trunk of the tree outward to cover an area approximately the diameter of the root zone of the tree. Capillary action will carry the water zone outward an extent beyond this area. This arrangement effectively waters an area from closely adjacent the tree trunk outward therefrom to an area extending to the outer limits of the root zone. Such watering, when applied in sufficient amounts, effectively carries the salt content downward below the root zone of the tree such that the watered area 26 is essentially free of any large or deleterious accumulations of salt as in the previously described embodiment.

As will be appreciated, the salt zone is then forced outward to the outer area indicated by the numeral 28. This method and apparatus effectively clears the root zone of the plant of salt accumulation.

Also because of the outward direction of the spray from the distributor, little or no moisture accumulates on the trunk or leaves of the tree. Thus, the chance for the development of pathogenic bacteria and fungi on the tree trunk is greatly reduced.

Turning now to FIG. 3 there is illustrated a preferred embodiment of the distributor apparatus of the present invention as seen therein. The apparatus indicated generally at 30 comprises a conduit member preferably constructed of an elastic or spring-like material, such as a plastic having a memory and having a generally semi-looped configuration (i.e. not a complete loop), with a neck extension therefrom. The apparatus includes a generally semi-looped portion 32 having a closed end 34 and a neck 36 with an open end 38 for connecting to a source of water or the like under pressure. The neck 36 is fitted with a suitable fitting, such as a barb fitting 40, for connecting to a pressure hose or the like.

As is obvious from the drawings (see FIGS. 2-6) the semi-looped portion extends in a plane which is substantially horizontal when the apparatus is in position about a tree. When in this position, the uppermost surface of the loop, or conduit is defined as the upper wall. The distributing nozzles are then seen to be mounted in the upper wall of the conduit or semi-looped portion of the apparatus.

The apparatus 30 as described has a semi-looped portion 32 and includes a throat area designated generally by the numeral 42 which can be enlarged by forcing the loop outward as illustrated in phantom for extending around the tree trunk. This throat area 42 is preferably on the order of approximately one-half of the diameter of the loop portion 32 and is preferably smaller than the diameter of the trunk of a tree 44 around which the loop is to be extended when the loop is in its normal position.

The loop is preferably constructed of a material having spring characteristics. Although metal may be used, plastic materials are preferred because they are typically lighter in weight and are corrosion resistant. One such material which has been successful is a polyethelene composition made in accordance with ASTM D1248 type 2 class C and may, for example, be of an approximate three-eighths inch inner diameter with a wall thickness of approximately six-one hundreths of an inch. The material is preferably constructed and treated to have an elastic quality to return or spring back to its original configuration after being sprung outward to fit around a tree trunk. This I refer to as being a semi-permanent shape because it can be temporarily changed but returns to its original shape. This arrangement permits a semi-permanent installation of a loop around a tree or the like such as within an orchard. The looped configuration fits and tends to stay closely around the tree trunk to permit the distribution of water or the like in a pattern as described above.

A plurality of orifices, such as spray heads 46, are evenly distributed about the circumference of the loop or semi-looped portion 32. These orifices or spray heads are preferably arranged to distribute liquid outward in a fan pattern as illustrated each having an angular area of coverage of approximately 180°. With three such distributors or orifices as illustrated in FIG. 3, the fan shaped patterns overlap in areas to provide a substantially annular area of watering surrounding the tree trunk from closely adjacent the tree trunk outward to an area sufficiently large enough to encompass the root zone.

Turning now to the embodiment of FIG. 4, a loop designated generally by the numeral 48 is fitted with a pair of oppositely disposed orifices 50 which are arranged to provide a pattern of coverage of approximately 210° each and to overlap at the ends of the fan pattern. This arrangement likewise provides an area of coverage such as that shown in FIG. 3 of annular configuration surrounding from closely adjacent to the tree trunk outwardly. Other patterns of spray heads covering different areas are apparent within the concept of this invention.

Turning now to FIG. 5, the distributor 30 shown in elevation includes a plurality of risers 52 which support spray heads 54 a distance H of several inches above the loop portion 32 of the distributor. This arrangement keeps the spray heads or nozzles above the accumulation of debris, such as leaves, weeds and the like, which may tend to accumulate over a period of time under a tree. The neck portion 36 of the distributor 30 may extend downward at an angle $\alpha$ of 15°, for example, for connection to underground water supply hose without danger of a bend in the hose and to permit the loop to rest evenly on the surface of the ground.

Turning now to the embodiment of FIG. 6, there is illustrated the distributing apparatus 56 wherein a plurality of upwardly curved portions 58 are provided at the position below where the distributing orifices 60 are to be mounted. This arrangement eliminates the need for risers 52 as in the previous embodiment. This arrangement raises the height of the nozzles 60 several inches above the surface of the ground to keep them above accumulation of debris and the like as explained above. This apparatus may likewise contain any number of nozzles distributed in any suitable pattern around the loop to provide an outwardly directed fan arrangement of the spray. The neck portion can likewise be extended downward at an angle to intercept lateral lines from a primary supply line to permit the loop to rest level on the ground thereby.

In the usual orchard application, a distributor such as described above is provided for each tree and located by placing such a pre-formed semi-permanent, semi-looped conduit closely around the tree trunk. A plurality of sprinkler heads having a fan-like pattern is mounted in the upper wall of the conduit to provide a fan pattern outward from the conduit. The spray pattern is arranged to extend away from the plant and arranged to partially overlap to provide a pattern as described above. A central supply line may be buried between rows of trees at a central location with individual supply lines running from the main supply line outward to each of the distributing loops. With such an arrangement, with the central supply line and lateral supply branches buried, normal cultivation can take place between the trees without disturbing the irrigation system.

The mounting and arrangement of the semi-looped conduit distributor or distributing apparatus is such as to be semi-permanent and require little or no maintenance and/or repair. The construction is preferably of a suitable tough plastic or the like to resist the elements and to resist damage from harvesting and cultivating equipment and the like. The semi-rigidity of the loop also assures that it will be held in place around the trunk of the tree under normal circumstances.

Thus, from the above it is seen that I have provided a method and apparatus for providing a semi-permanent irrigation apparatus for mounting closely adjacent a tree trunk to distribute a pattern of water outward away from the tree trunk covering an annular area from closely adjacent the tree trunk outward to cover the root zone of the tree. An elastic semi-looped device is provided for each tree assuring a semi-permanent installation of the irrigation system.

While I have described my invention with regard to specific embodiments, it is to be understood that numerous changes and modifications may be made therein without departing from the spirit and scope of the invention as defined in the appended claims.

I claim:

1. A method of distributing a liquid around plant, comprising:
   selecting and forming spring conduit means having an open end and a closed semipermanently shaped, into a semicircular spring loop defining a variable throat having a width less than the diameter of said loop,
   mounting a plurality of sprinkler heads having a fan shaped spray pattern in the upper wall thereof, said upper wall being defined as the upper surface of the conduit when the loop lies in a substantially horizontal plane;
   hooking said loop around the trunk of a plant, connecting said open end of said conduit means to a supply of liquid under pressure;
   arranging said spray patterns to extend solely away from said plant; and
   arranging said spray patterns to partially overlap for thereby forming an annular spray pattern about said plant.

2. The method of claim 1 comprising the step of mounting a maximum of two sprinkler heads in said loop directly opposite one another; and,
   arranging said spray patterns of each of said sprinkler heads to cover an area extending at least 210° about said head.

3. The method of claim 1 comprising the step of mounting a maximum of three sprinkler heads in said loop evenly distributed about said plant; and,
   arranging said spray pattern from each of said sprinkler heads to cover an area extending at least 180° about said head.

4. The method of claim 1 comprising the step of pre-forming said loop from a polyethylene material of ASTM D1248 Type 2, Class C.

5. The method of claim 1 comprising the step of pre-forming said loop to have a loop diameter exceeding the diameter of the trunk of said plant.

6. The method of claim 1 comprising the step of arranging said spray pattern to extend upward from said sprinkler head at approximately 20° from the horizontal.

7. The method of claim 1 wherein:
   the step of hooking said loop about the trunk of a plant comprises hooking said loop about a citrus fruit tree; and
   the step of connecting said conduit to a supply of liquid under pressure comprises connecting said conduit to a supply of irrigation water.

8. A liquid distribution apparatus for distributing a liquid about an agricultural plant comprising:
   elongated elastic conduit means constructed of a spring-like material having a closed end and an open end for connection to a liquid supply line and semipermanently shaped for defining a semicircular spring loop conduit means biased into said loop shape for extending in a substantially horizontal plane for hooking about and at least partially encircling the trunk of a plant, said loop defining a variable throat width having a width less than the diameter of said loop and,
   means defining a plurality of sprinkler heads having a fan shaped, overlapping spray pattern for directing liquid upwards and solely away from the center of said loop means when said loop means is mounted in a substantially horizontal plane for defining an annular spray pattern for extending around a plant encircled by said loop.

9. The liquid distribution apparatus of claim 8 comprising a pair only of outlet opening means located on opposite sides of said center and each said opening means including means defining a spray pattern covering a fan shaped pattern extending outward therefrom and overlapping a portion on each side of each adjacent pattern.

10. The liquid distribution apparatus of claim 8 including a substantially straight section of said conduit means extending from said open end to said loop, said straight section extending outward from the axis of said loop and defining a neck; and,
    said closed end extending to a position in close proximity to the juncture of said neck to said loop defining a throat in said loop.

11. The liquid distribution apparatus of claim 10 wherein said throat is less than one-half the diameter of said loop.

12. The distribution apparatus of claim 10 wherein said neck extends downward approximately 15° from the plane of said loop for connection to a subsurface supply line.

13. The distribution apparatus of claim 12 wherein said outlet openings are mounted on risers for mounting said nozzles above the plane of said conduit means.

14. The distribution apparatus of claim 13 wherein said riser comprises an upward curve permanently formed in said loop.

* * * * *